United States Patent [19]

Koppernaes et al.

[11] Patent Number: 5,073,413

[45] Date of Patent: Dec. 17, 1991

[54] METHOD AND APPARATUS FOR WETTING FIBER REINFORCEMENTS WITH MATRIX MATERIALS IN THE PULTRUSION PROCESS USING CONTINUOUS IN-LINE DEGASSING

[75] Inventors: Christian Koppernaes, Bedford, Canada; Stephen G. Nolet, Leominister; Jerome P. Fanucci, Arlington, both of Mass.

[73] Assignee: American Composite Technology, Inc., Boston, Mass.

[21] Appl. No.: 531,508

[22] Filed: May 31, 1990

[51] Int. Cl.$^5$ .............................................. B05D 3/12
[52] U.S. Cl. .................................... 427/356; 427/294; 261/102
[58] Field of Search ................... 427/356, 358, 294; 156/180, 181, 166, 441; 261/102, DIG. 78

[56] References Cited

U.S. PATENT DOCUMENTS

| | | | |
|---|---|---|---|
| 2,748,886 | 6/1956 | Wilderbour | 427/356 X |
| 3,946,097 | 3/1976 | Takahashi et al. | 264/102 X |
| 4,022,153 | 5/1977 | Rake et al. | 118/DIG. 18 |
| 4,088,468 | 5/1978 | Roberson | 427/294 X |
| 4,939,002 | 7/1990 | Hilakos | 118/DIG. 18 |

Primary Examiner—Shrive Beck
Assistant Examiner—Bashore: Alain
Attorney, Agent, or Firm—Hale and Dorr

[57] ABSTRACT

This invention is a method and apparatus for wetting fiber reinforcements with plastic or resin matrix materials. The fibers are impregnated with matrix material, associated into a tow, passed through a pultrusion die and degassed by applying a reduced pressure. The apparatus includes a pultrusion die having an elongated body having a longitudinally extending channel through which the tow is pulled, entrance and exit ports, a first, enlarged diameter cavity portion, at least one matrix material injection port for injecting matrix material under pressure into the first cavity and into the tow, and a second enlarged cavity portion having a low pressure application port for applying a pressure substantially below that of the first cavity. The apparatus may alternatively have only one enlarged cavity portion, with both injection and vacuum application ports, or alternatively, may be used with conventional wet bath equipment, where an enlarged cavity portion is used for vacuum application.

2 Claims, 7 Drawing Sheets

METHOD AND APPARATUS FOR WETTING FIBER REINFORCEMENTS WITH MATRIX MATERIALS IN THE PULTRUSION PROCESS USING CONTINUOUS IN-LINE DEGASSING

This invention relates generally to the field of fiber reinforced composite materials of a resinous or plastic matrix and specifically to a method and apparatus for improving the wetting of the fibers with the resin or plastic matrix material, using a continuous in-line degassing apparatus and step.

BACKGROUND OF THE INVENTION

Many composite materials are made by combining reinforcing fibers with resinous or plastic matrix material. A number of different manufacturing techniques are used to produce the composite parts. One of the least expensive techniques is the pultrusion process. As the name would suggest, pultrusion is a combination of a pulling and an extrusion process. The reinforcement structure, which may be fibers, cloth, or other forms, is continuously pulled from spools and impregnated with the matrix material. The combined matrix impregnated reinforcement fiber is formed into its final shape by pulling it through a heated die. The final curing of the composite also occurs in the downstream portion of the die.

A critical stage of the pultrusion process is the application of the matrix material to the reinforcement structure. The object is to impregnate the reinforcement structure, both around the various discrete elements, and throughout each discrete element with the matrix material as fully as possible. Voids and air pockets are undesirable. Increased numbers and size of voids generally results in less desirable structural properties of the composite. High void content reduces various properties, including strength and resilience and makes it more difficult to machine the composite.

It is known to apply the matrix material to the reinforcement material using a process known as a wet bath. A typical wet bath system is shown schematically in FIG. 1. Reinforcing material of fiber 2 is maintained on racks 4, or spindles or other suitable support. Additional reinforcing material of cloth 6 is maintained on racks 8 and spindles 10. The fiber strands 2 pass through preforming guides 12 to associate the fibers in a preliminary grouping. The fiber strands 2 and the cloth bolts 6 pass together through first material guide 14 and come together in closer association. A tank 16 holds a volume of liquid matrix material, such as resin. The associated reinforcement tow of fibers 2 and cloth 6 is drawn through the resin bath and resin soaks into the reinforcement material, just as water soaks into a towel dropped into a bath tub. The wetted tow 18 is drawn through rollers 20 and a second material guide 22, which further shapes the composite. The composite tow is shaped within pultrusion die 24, described in more detail below, where it is also cured by action of heaters 26.

Various arrangements for advancing the tow are known. FIG. 1 shows a basic configuration. A pair of hydraulic rams 28, 30 are each attached to a clamping pulling mechanism 32, 34 respectively. The pulling mechanisms act in alternation, first one clamping down on the tow with its movable element 36, and then activating its hydraulic ram to pull the tow away from the beginning of the line. Simultaneous with this action, the other mechanism 34 has disengaged its movable element 38 and reversed its hydraulic ram 30 to bring the pulling mechanism 34 back to the beginning position. Thus pulling mechanism 34 will be ready to engage the tow when pulling mechanism 32 has reached the end of its travel. Downstream, cutoff saw 40 cuts of the cured composite material in whatever lengths are desired. As an alternative, a system of roller pullers can be used to move material through the system.

The wet bath process has a number of drawbacks. Only a limited number of matrix materials can sit in the bath for the long periods of time needed to be soaked up without spontaneously curing or hardening. Further, due to the relatively long period of time it takes for the resin to soak into the reinforcement material, the line can not exceed a certain speed. The line is a series of continuous operations and the speed of the slowest operation controls the pace of the entire system. When the resin sits in the open tank for a period of time, it is subject to contamination. Finally, the large, substantially open resin tank releases potentially dangerous vapors into the factory atmosphere.

Another known technique, called the direct resin injection technique, avoids some of the problems of the wet bath method. The direct resin injection technique is shown schematically in FIG. 2. Most of the elements are the same as in the wet bath technique, and are referred to by like reference numerals. In the place of the wet bath, the direct injection technique may optionally use a preheater 17. The preheater 17 heats the reinforcement material to facilitate impregnation with matrix material. The reinforcement material is drawn through pultrusion die 24 (discussed in more detail below). Within the die 24, resin is introduced through port 42, from pressurized tank 44 and line 46 or other resin pumping mechanisms.

FIG. 3 shows schematically resin injection pultrusion die 24 of the prior art. Prior art dies for wet bath pultrusion do not contain an injection region. The associated reinforcement material of fibers 2 and cloth 6 enter the die at entrance port 50. The initial portion of the die immediately in the vicinity compresses the bulk of the associated reinforcement material. Downstream from the initial, substantially highly compressed fiber region is a cavity 52 of a larger volume. Injection ports 42a and 42b provide matrix material resin or plastic at elevated pressure, and possibly elevated temperature, into the cavity 52. The resin is delivered from line 46. A valve 54 may be provided to adjust pressure or to facilitate cleaning. The cavity 52 is of a generally teardrop shape, with the portion of larger cross section in the upstream direction and the portion of smaller cross section in the downstream direction. As the resin is pumped into the cavity under pressure, it impregnates the bundle of compressed reinforcement material. It occupies the spaces between various fibers and elements of the reinforcement material, and also the spaces within the fibers themselves. The pulling action of the impregnated composite, toward the narrow end of the cavity 52, and the taper itself, combine to create a hydraulic pressure, which is typically higher than the matrix material injection pressure. The majority of trapped air in the composite is forced upstream due to the hydraulic pressure, and eventually exits the die through entrance port 50. Heaters 26 keep the die at an elevated temperature so that the resin cures at an appropriate rate. The resin injection pressure and the degree of compression of the reinforcement material determine the speed of the resin flow and hence the pulling speed of the product.

The direct resin injection method overcomes many of the drawbacks of the wet bath method. It provides a generally cleaner work environment and increases the number of matrix materials that can be used. However, the void content of direct injected composites is unsatisfactorily high, often as much as 20% by volume.

Voids are created by trapped air bubbles. This is especially true when "straight rovings" or mats with fiber orientations at 90° to the pulling direction are used. Air is also usually present in the resin due to the normal methods of mixing in the resin catalysts or other additives. It is not normal procedure to degas the resin prior to processing because the time required to do this is usually longer than the "pot life" of the catalyzed resin. "Pot life" refers to the length of time the resin can sit in liquid form at the applied temperature and remain liquid and uncured. Continuous wetting of the reinforcement fibers depends on the ability to initially penetrate transversely through the fibers and completely wet out the tows. Then the resin can propagate longitudinally upstream toward the entrance the die as the fiber tow passes through the cavity. Even in the compressed state, fluffy type roving (such as Nordic 4000 Spunnrovings or FGI Texstrand) still has a high degree of resin permeability making these products highly conducive to this type of processing. It is believed that this is due to the criss-crossing of neighboring filaments within a strand. Straight rovings (sometimes called gun rovings) have highly parallel filaments within the strand and pack very closely even if relatively little external pressure is applied (low compressibility but high density). Thus, they are less conducive to this type of processing.

Applying increased resin pressure is not always sufficient to cause the resin to penetrate the strand. The viscosity of the resin is often so high that the resin coats the outside of the strand and creates a viscous shell. The external resin pressure exaggerates the problem by compacting the strand.

To date, the processing of straight rovings and reinforcement materials (mats) made with straight rovings has proven too difficult for processes using the injection pultrusion method.

The main requirements for the design of an injection chamber are to achieve transverse penetration and removal of as much of the voids as possible. The chamber is generally made to be about twice the thickness of the part and have the symmetric teardrop shape as shown in FIG. 3. It is generally about 4 inches long and has a 2 inch long primary compression region preceding the chamber. The resin flows into the chamber through holes placed in the widest part of the chamber on both sides. The number of holes is determined by the designers' judgement from experience and on the complexity of the part. Generally, greater numbers of holes improves processing.

For the reasons discussed above, it is desirable to further reduce the void content of composites below that produced by the direct injection method.

OBJECTS OF THE INVENTION

Thus, the several objects of the invention include providing a method and apparatus for wetting fiber reinforcements with matrix materials in the pultrusion process that: produces a contamination free composite having a low void content; does not subject the workplace to the release of potentially dangerous vapors; permits relatively high speed pulling of the finished composite; and can be used on a large variety of matrix materials, even those that spontaneously cure in relatively short times.

BRIEF DESCRIPTION OF THE INVENTION

In a first embodiment, the method of the invention is a method for wetting an association of fiber reinforcements with matrix materials in a pultrusion process comprising the steps of closely associating the fiber reinforcements, injecting matrix material into the association of reinforcements at a first enlarged cavity portion of a pultrusion die, degassing the association of reinforcements impregnated with matrix material by passing it through a second enlarged cavity portion of the pultrusion die, the second enlarged cavity being of a pressure substantially lower than the pressure of the first enlarged cavity portion of the die, preferably less than atmospheric pressure, and curing the composite reinforcement material and matrix material.

In a second embodiment, the method of the invention is a method for wetting an association of fiber reinforcements with matrix materials in a pultrusion process comprising the steps of closely associating the fiber reinforcements, injecting matrix material into the association of reinforcements at a first enlarged cavity portion of a first pultrusion die, degassing the association of reinforcements impregnated with matrix material by passing it through a second enlarged cavity portion of the pultrusion die, the second enlarged cavity being of a pressure substantially lower than the pressure of the first enlarged cavity portion of the die, and usually less than atmospheric pressure, injecting matrix material into the degassed, impregnated association of reinforcements at a third enlarged cavity portion of the first pultrusion die and passing the degassed, twice impregnated association of reinforcements into a conventional pultrusion die and shaping the composite impregnated reinforcement into a shape of the desired cross-section.

In a third embodiment, the apparatus of the invention is a pultrusion die for shaping an association of reinforcement fibers impregnated with matrix material into a shape of a desired cross section, the die comprising a longitudinally extending channel through which the association of reinforcement fibers is pulled in a direction designated from upstream to downstream, the channel having an entrance port at the upstream end and an exit port at the downstream end, the die having a first cavity portion of an enlarged cavity diameter, at least one resin injection port for injecting resin under pressure into the cavity, and a second cavity portion of an enlarged cavity diameter, and at least one vacuum application port for applying reduced pressure to the second cavity portion.

DETAILED DESCRIPTION OF PREFERRED EMBODIMENTS OF THE INVENTION

The method and apparatus of the invention will be understood with reference to the accompanying drawing and the following detailed description.

The method of the invention is to use conventional pultrusion equipment, except for the pultrusion die. A special resin injection pultrusion die is used, having at least one additional cavity for the application of a vacuum. The method of the invention is referred to as "vacujection". The fibers and cloth elements of the reinforcement are associated conventionally, using material guides. A preheater may be used, but is not required. Conventional pulling mechanisms engage and disengage around the formed composite, and alternatively pull the formed composite and return to their starting positions. The formed composite is cut off from the upstream portion of the composite at desired lengths.

Figure 4:
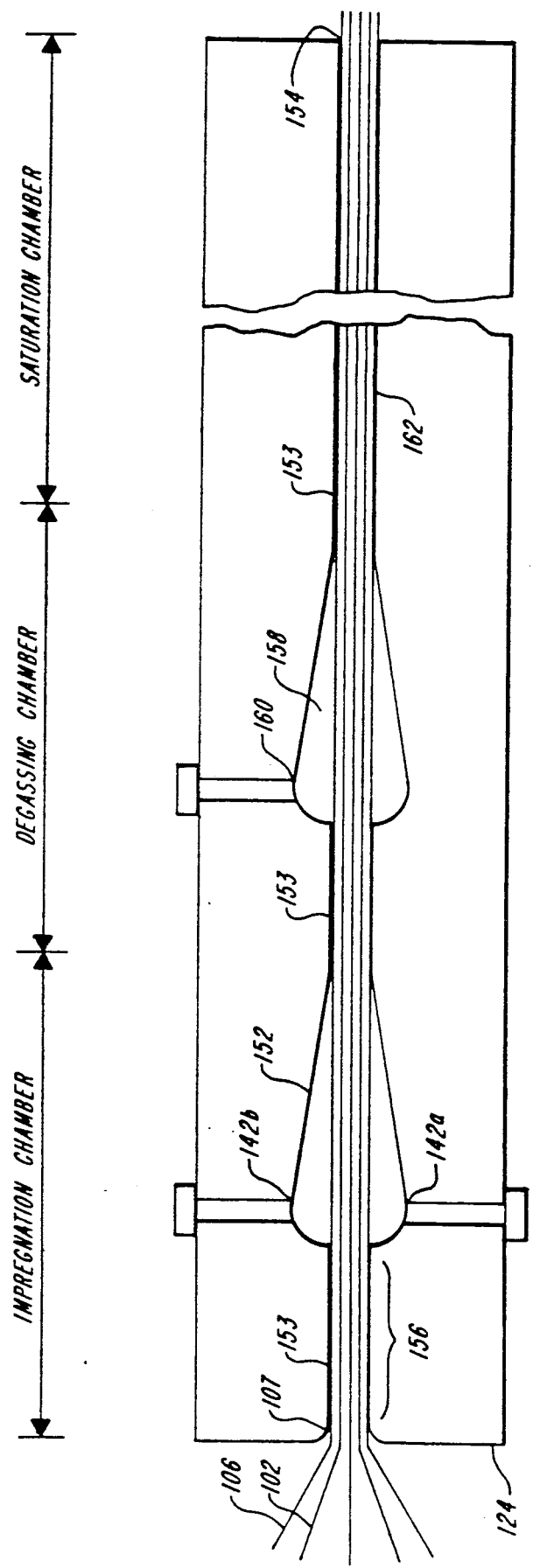
FIG. 4 is a schematic cross-sectional representation of an embodiment of the apparatus of the invention having an injection cavity and a vacuum cavity for use as a pultrusion die.

A first preferred embodiment of the pultrusion die of the invention is shown schematically in FIG. 4. The die 124 has a longitudinal channel 153, extending from an inlet port 150 at its upstream end to an exit port 154 at its downstream end. Reinforcement material 102 and 106 enters the inlet port 150 and is compressed into a reinforcement tow 107 at a fiber compression region 156 of longitudinal channel 153. A first matrix injection cavity 152 has a cavity volume at its upstream end substantially larger than the volume of the compression region 156. The first matrix injection cavity is also referred to as the impregnation cavity. Typically, the largest internal diameter of the matrix injection cavity 152 is approximately two times the maximum thickness of the part to be formed. The matrix injection cavity 152 is generally teardrop shaped, tapering gradually to a smaller diameter at the upstream end. The smaller diameter is typically substantially equal to the dimension of the fiber compression region, although this is not necessary. A typical length for the cavity for the forming of polyester resin is 4 inches. One of ordinary skill in the art will understand that it may be necessary to enlarge the diameter of the cavity, or its length to accommodate the flow characteristics of the matrix material. As a general rule of thumb, more viscous matrix material will require a larger cavity.

Figure 1:
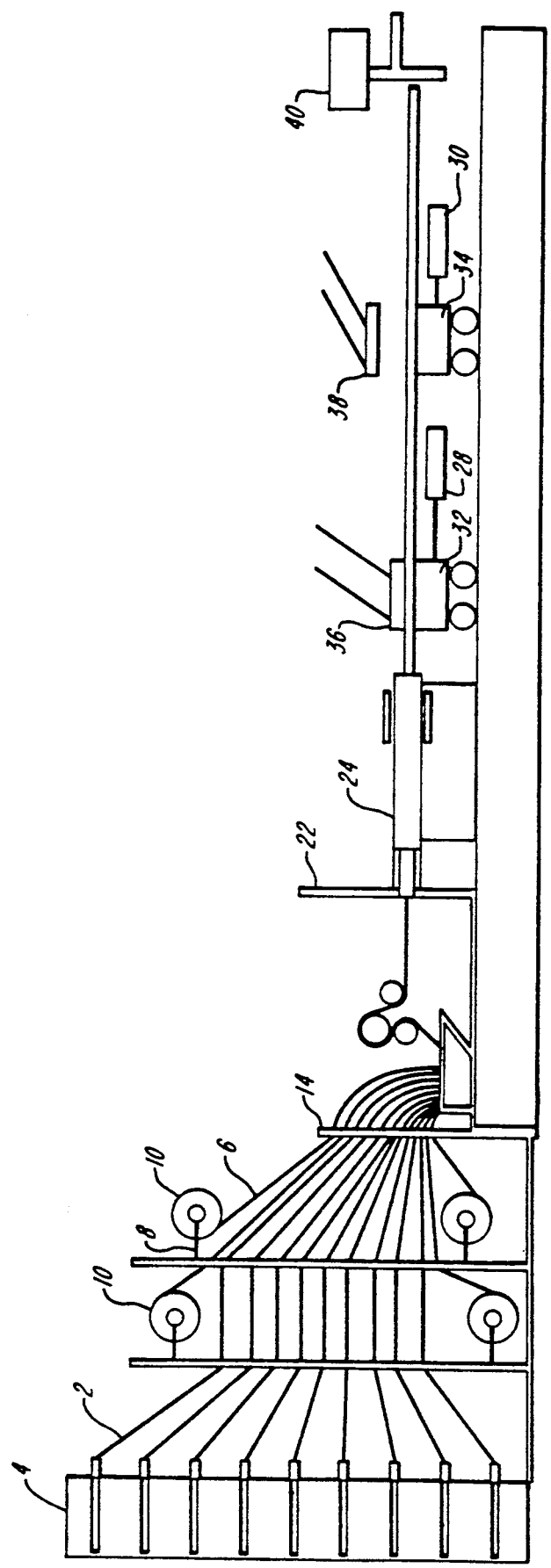
FIG. 1 is a schematic representation of the prior art wet bath pultrusion apparatus.
Figure 2:
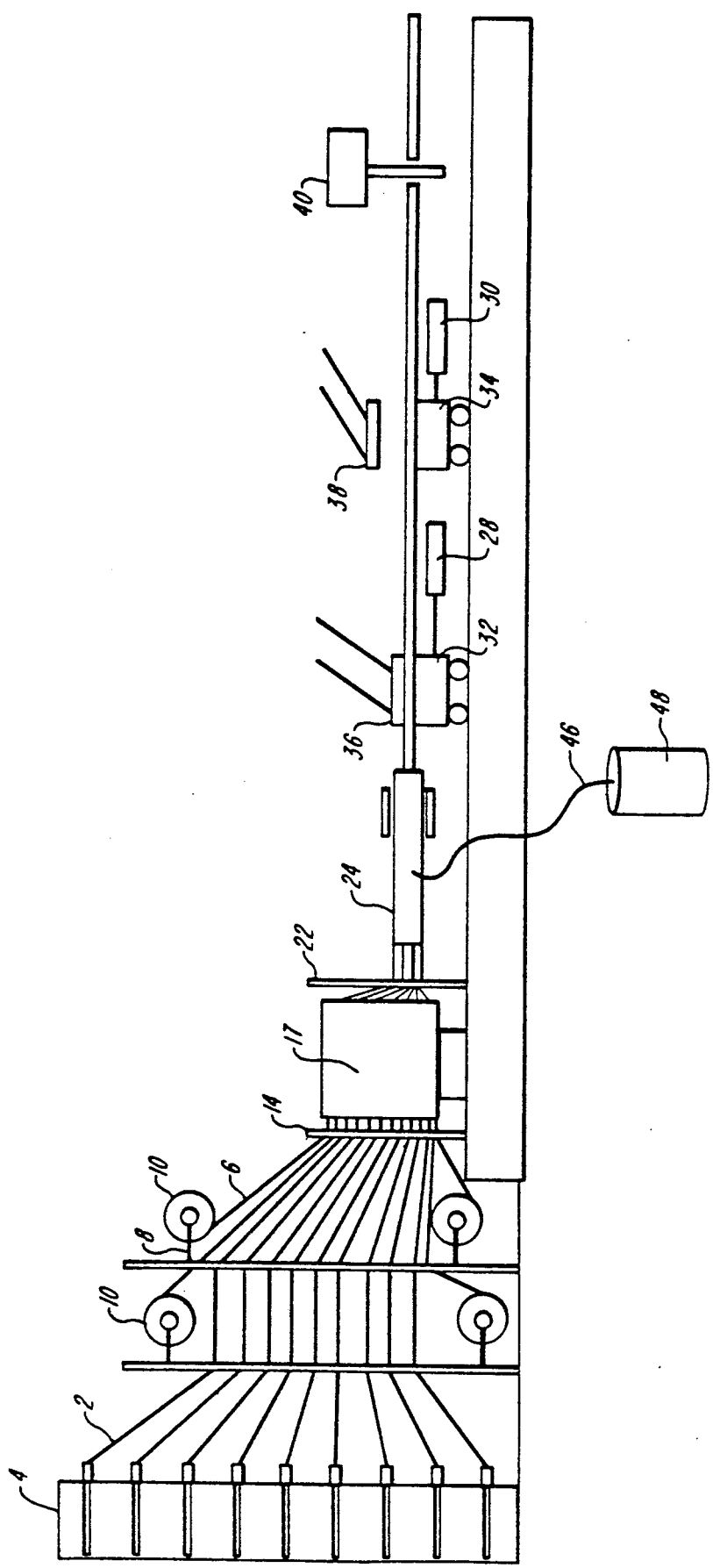
FIG. 2 is a schematic representation of the prior art direct resin injection pultrusion apparatus.
Figure 3:
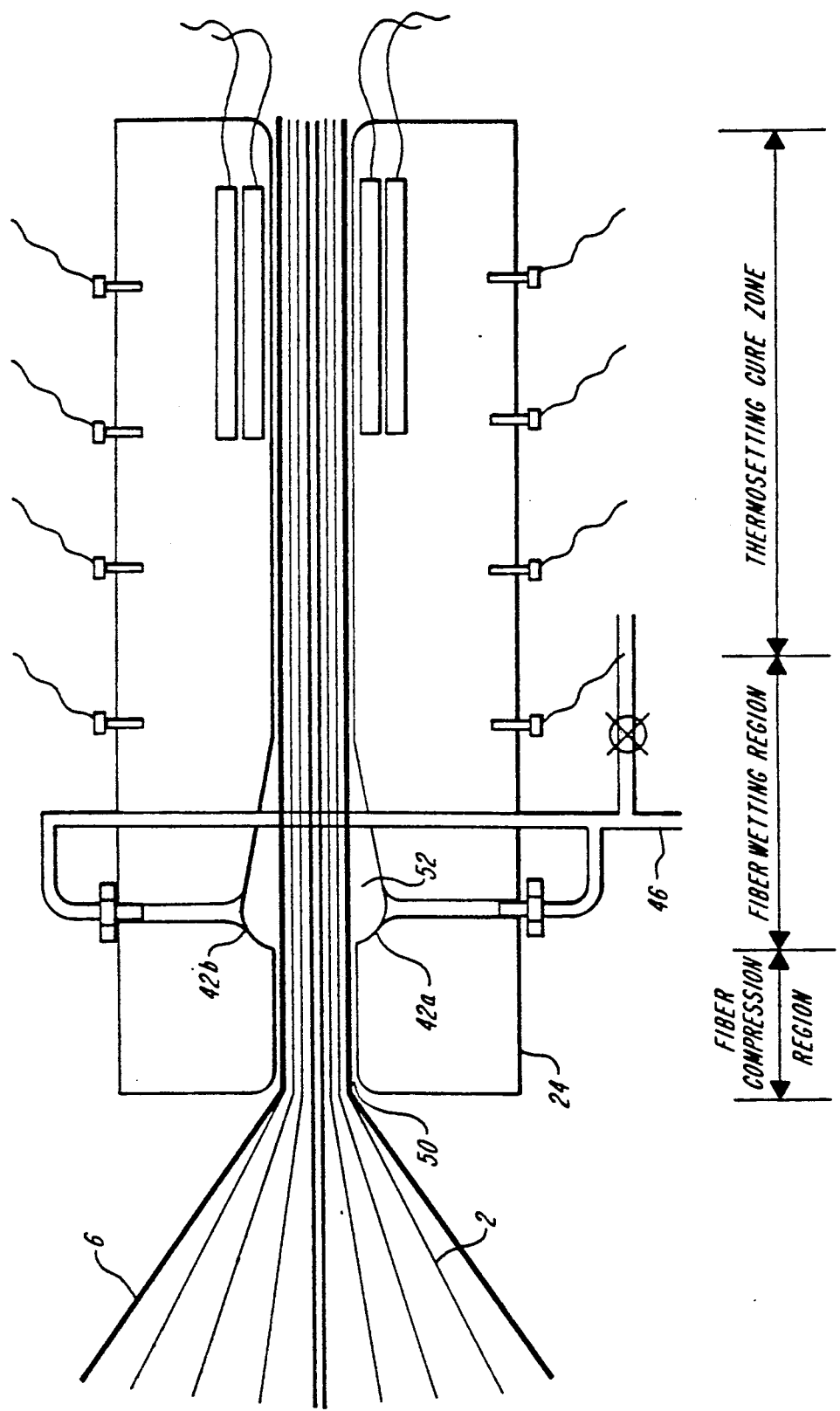
FIG. 3 is a schematic cross-sectional representation of the prior art direct resin injection die.

Matrix injection ports 142a and 142b are provided in the resin injection cavity 152, at roughly the location of the greatest diameter. Matrix material is injected under pressure through these ports from a pressurized matrix material source not shown, but which may be identical to the pressurized matrix material source of the prior art shown in FIG. 2. The injected matrix material accumulates around the associated fibrous reinforcement. Because all of the matrix material does not immediately impregnate throughout the entire complex of reinforcement material, it is necessary that the size of the matrix injection cavity 152 at the general vicinity of the matrix injection ports 142a and 142b be substantially larger than the associated reinforcement tow 107.

At the general vicinity of the injection ports 142a and 142b, the composite matrix material and reinforcement material includes a relatively high volume of voids within its general confines. As the tow is pulled along in the downstream direction, a high hydraulic pressure arises in the narrowed region downstream of the narrow end of matrix injection cavity 152. Under action of the high pressure, a significant quantity of the air or other gas that creates the voids in the composite is forced upstream, thereby substantially degassing, or devoiding the composite. The air or gas exits the pultrusion die 124 through inlet port 150.

Downstream of the matrix injection cavity 152 is a second enlarged cavity, the vacuum application cavity 158. The vacuum application cavity is also referred to as the degassing cavity. The vacuum application cavity 158 is of substantially the same shape and size as the matrix injection cavity 152, although this is not required. Within the vacuum application cavity 158 is provided a vacuum port or ports 160. A vacuum pump (not shown) or other device for reducing the pressure in vacuum application cavity 158 is connected to vacuum port 160. The pressure in cavity 158 is reduced substantially below that of resin injection cavity 152. The reduction in pressure causes gas bubbles, which were formed under high pressure in the matrix injection cavity 152, to expand dramatically to the point that they burst. The gas from the burst bubbles either becomes entrapped in larger bubbles or is released to the vacuum application cavity 158, where it is removed through the vacuum port 160. The expansion and bursting of gas bubbles helps to promote matrix material wetting of the reinforcement material, because the motion of the matrix material that bounds the bubbles washes over and through the reinforcement tow.

As the degassed composite is drawn in the downstream direction, it encounters the narrowing end of vacuum application cavity 158, which recompresses the degassed composite into a more compact association.

A shaping region 162 is provided downstream of vacuum application cavity 152, where the composite is reduced to its final thickness and shape and then maintained at controlled temperatures and pressures as it cures and hardens.

Another preferred embodiment of the invention is the method of providing a vacuum degassing stage upstream of a prior art pultrusion die of the type that has been described with respect to the wet bath system. According to this method, a vacuum degassing die is provided, as described below, in the place of the wet bath tank. The output of the degassing die is a compressed composite of reinforcement material and matrix material, which has been substantially degassed. It is in a nominal precursor shape, selected to facilitate further shaping by the conventional pultrusion die. The other steps of the method are the same as in a standard pultrusion process, as have already been described.

Figure 5:
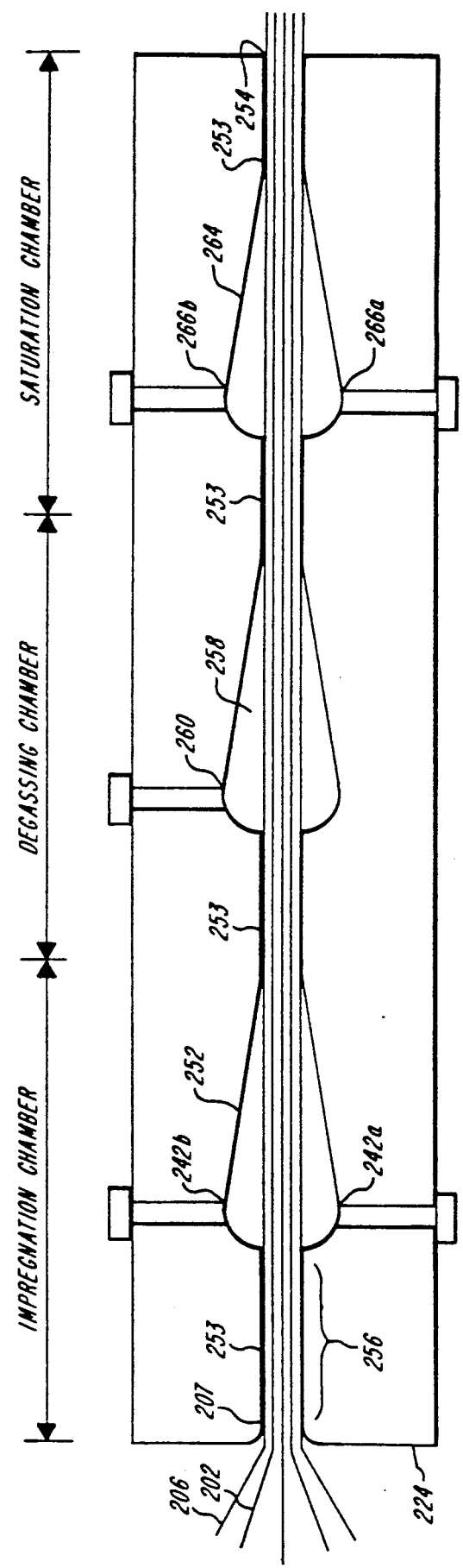
FIG. 5 is a schematic cross-sectional representation of an embodiment of the apparatus of the invention having a first injection cavity, a vacuum cavity and a second injection cavity for use upstream of a conventional pultrusion die.

A preferred embodiment of the apparatus of the invention, suitable for use in connection with the method of the invention that substitutes the degassing die for the wet bath is shown schematically in cross section in FIG. 5. The degassing die 224 has a longitudinal channel 253, extending from an inlet port 250 at its upstream end to an exit port 254 at its downstream end. Reinforcement material 202 and 206 enters the inlet port 250 and is compressed into a reinforcement tow 207 at a fiber compression region 256 of longitudinal channel 253. A first matrix injection cavity 252 has a cavity size at its upstream end substantially larger than the size of the compression region 256. The matrix injection cavity 252 is generally teardrop shaped, tapering gradually to a smaller diameter at the upstream end.

Matrix injection ports 242a and 242b are provided in the resin injection cavity 252, at roughly the location of the greatest diameter. Matrix material is injected under pressure through these ports from a pressurized matrix material source not shown, but which may be identical to the pressurized matrix material source of the prior art shown in FIG. 2. The injected matrix material accumulates around the associated fibrous reinforcement. It is necessary that the thickness dimension of the matrix injection cavity 252 at the general vicinity of the matrix injection ports 242a and 242b be substantially larger than the associated reinforcement tow 207.

At the general vicinity of the injection ports 242a and 242b, the composite matrix material and reinforcement material includes a relatively high volume of voids within its general confines. As the tow is pulled along in the downstream direction, a high hydraulic pressure arises in the narrowed region downstream of the narrow end of matrix injection cavity 252. Under action of the high pressure, a significant quantity of the air or other gas that creates the voids in the composite is forced upstream, thereby substantially degassing, or devoiding the composite. The air or gas exits the degassing die 224 through inlet port 250.

Downstream of the matrix injection cavity 252 is a second enlarged cavity, the vacuum application cavity 258. The vacuum application cavity 258 is of substantially the same shape and size as the matrix injection cavity 252, although this is not required. Within the vacuum application cavity 258 is provided a vacuum port or ports 260. A vacuum pump (not shown) or other device for reducing the pressure in vacuum application cavity 258 is connected to vacuum port 260. The pressure in cavity 258 is reduced substantially below that of resin injection cavity 252. The reduction in pressure causes gas bubbles, which were formed under high pressure in the matrix injection cavity 252, to expand dramatically to the point that they burst. The gas from the burst bubbles either becomes entrapped in larger bubbles or is released to the vacuum application cavity 258, where it is removed through the vacuum port 260. The expansion and bursting of gas bubbles helps to promote matrix material wetting of the reinforcement material, because the motion of the matrix material that bounds the bubbles washes over and through the reinforcement tow.

As the degassed composite is drawn in the downstream direction, it encounters the narrowing end of vacuum application cavity 258, which recompresses the degassed composite into a more compact association.

A third enlarged cavity 264 constitutes a second matrix material injection cavity downstream of the vacuum application cavity. The second matrix material injection cavity 264 is also referred to as the saturation cavity. This cavity is virtually identical to the resin injection cavity 252, having matrix material injection ports 266a and 266b, and being of a generally teardrop shape. This second matrix material injection cavity is useful in cases where the degassing die can not be sealed up against the pultrusion and curing die. The matrix material injected at this second matrix material injection cavity forms a plug in the upstream end of the degassing die, to keep air from being drawn into the degassing die 224, under influence of the vacuum at vacuum application cavity 258. It also replenishes any matrix material that may have been drawn off by the vacuum.

This type of three-cavity tool described immediately above can also be used as an inline degassing device for traditional wet bath pultrusion with conventional wet out and curing tooling. The process using this three cavity tool without a wet bath and with a wet bath is identical, except that with a wet bath, no matrix material need be injected into the first cavity.

It is also possible to use a two cavity pultrusion die, with no initial injection cavity. In that case, the wetted tow passes into the die and into an enlarged cavity portion as described above. Pressure substantially below ambient is applied to remove gas from the wetted tow. The second enlarged cavity constitutes a matrix material injection cavity identical to cavity 264 described above. It likewise is useful in cases where the degassing die cannot be sealed up against the pultrusion and curing die.

If the degassing die can be sealed up against the pultrusion and curing die, then the apparatus of the invention can consist of a single enlarged cavity alone. Pressure substantially below ambient is applied to the enlarged cavity, degassing the wetted tow, as described above. From the reduced pressure cavity, the tow passes directly into the pultrusion and curing die.

Another embodiment of the method of the invention, that is useful in cases where it is for other reasons not possible or desirable to add a specially designed vacuum die, is to follow the normal procedure for a direct injection method discussed above, and to add a further step of applying a vacuum to one or more of the matrix material injection ports.

Figure 6:
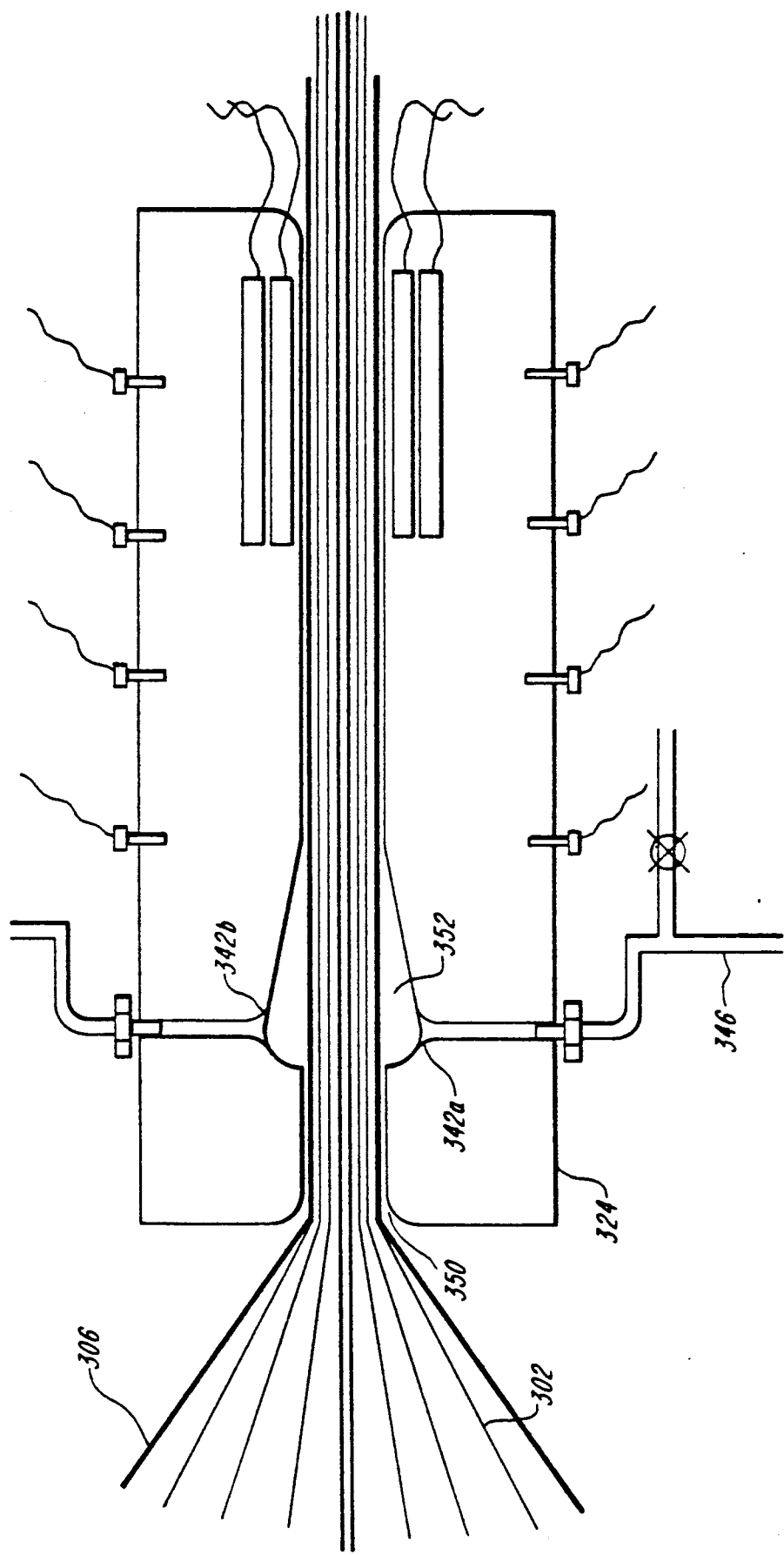
FIG. 6 is a schematic cross-sectional representation of an embodiment of the apparatus of the invention having an injection cavity with an injection port and a vacuum port.

As shown in FIG. 6, port 342b, which is customarily used as a port for the injection of matrix material, has been connected to a vacuum source (not shown). It is necessary to pneumatically isolate the port chosen for application of the vacuum from the ports used for matrix material injection. The vacuum is drawn simultaneously with the injection of the matrix material. The presence of the vacuum helps remove gas filled bubbles that cause voids, and also helps to draw the resin through the reinforcement material.

The method and apparatus of the invention can be used with a wide variety of matrix materials, including traditional long pot life, quick cure resin formulations designed specifically for pultrusion. Long pot life refers to the formulations' capacity to remain uncured and liquid for a sufficiently long time to process. Examples of such resins are epoxies, polyesters, vinylesters and phenolics. These resins may be pulled generally at speeds of from 1 to 10 feet per minute. The invention is also suitable for use with thermoplastics, such as nylon and polycarbonate. These thermoplastics may be pulled at much higher speeds than the resins mentioned above, sometimes as much as ten times the speed.

The invention can be used with normal industry formulations, including mold releases and other additives. The selection of the temperatures and the pressures must be made by routine experimentation with the matrix and reinforcement materials and the other equipment available. In general, the higher the temperature and pressure applied, the lower will be the viscosity of the matrix material and the faster it will flow. However, the matrix material cures, or hardens, at a faster rate at elevated temperatures. Therefore, it is necessary to keep the temperature low enough so that the matrix material does not harden in the die injection chambers, or supply lines.

EXAMPLE 1

The apparatus of the invention has been used to dramatically decrease the void content of a composite with a glass/phenolic resin matrix. When manufactured using the direct injection method, a void content of 20% by volume was experienced. Use of the separate three cavity degassing die embodiment of the apparatus of the invention upstream of a traditional pultrusion die reduced the void content to 2% by volume.

EXAMPLE 2

Using apparatus and method of Example 1 and using vinyl ester resin instead of glass/phenolic resin, the product produced by the method of the invention increased in weight by 12% over the product made according to the prior art. This demonstrates that the voids of the prior art product had been replaced with matrix material.

Figure 7:
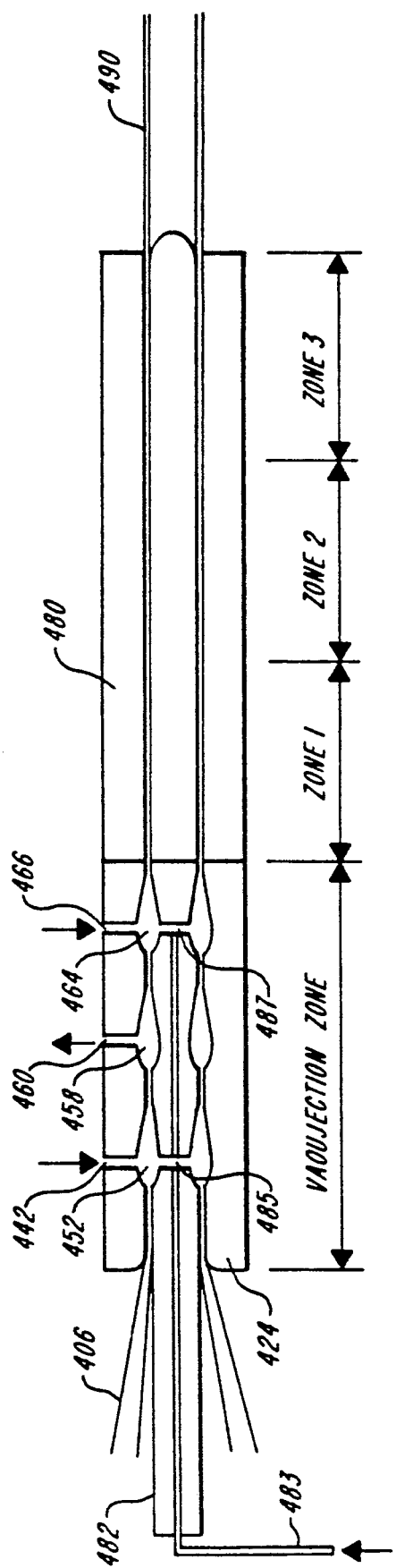
FIG. 7 is a schematic cross-sectional representation of a three cavity embodiment of the apparatus of the invention for use with a mandrel upstream of a pultrusion die for tube forming.

It is also an aspect of the invention to apply it to well known techniques of forming parts having complicated shapes. For instance, for a tube, it is known to introduce a mandrel into the pultrusion die from the upstream end. FIG. 7 shows schematically a vacujection component for use with a standard tube pultrusion die 480 and mandrel 482. The mandrel 482 is provided with means 483, 485, 487 for injecting resin at locations coinciding with the resin injection cavities 452, 464. Means may also be provided to apply a vacuum at the location coinciding with the vacujection cavity 458. If a mandrel is used, the impregnating cavity 452 and degassing cavity 458 (and, if present, saturation cavity 464) must be annular, occupying a space between the outside of the mandrel 482 and the inside of the vacujection component 424. The portions of the mandrel 482 that mate with the cavities 452, 458, 464 must be shaped so as to form the inside surface of the annular cavities. Each annular cavity has a teardrop cross section arranged similarly to the solid part design discussed above. Downstream of the vacujection component 424, the tube 490 enters the standard pultrusion die 480. The mandrel 482 typically extends into the pultrusion die 480, although it is possible to use a separate mandrel.

EXAMPLE 3

Using the apparatus shown generally in FIG. 7, resol resin, and glass reinforcement parts were made and compared to parts made according to the prior art.

The glass fiber tow consisted of 5 layers of 24 oz. mat arranged to form around the mandrel as they were pulled into the die. The parts were made on a 1" inside diameter tube die with internal mandrel. The die was a typical pultrusion die as used in industry and was fitted with a separate vacujection component of the three cavity design shown in FIG. 5. The resin was injected into the first resin injection cavity 252 and the second resin injection cavity 264 simultaneously at a pressure of approximately 30 Psi. A vacuum of 30 inches Hg was applied to the vacuum application, or degassing cavity 258. The product was pulled at about 15 cm/min. through the standard pultrusion die. The die downstream of the vacujection component was configured to have three zones of heating, each about one foot long along the three foot die. Zone 1, the closest to the vacujection chamber, was maintained at 100° C., zone 2 was maintained at 140° C. and the exit zone, zone 3 was maintained at 170° C.

A 12% increase in weight was measured in the part made using the degassing chamber over the identical part made without implementing degassing. Microscopic observations showed that the part made without degassing had a rough dull surface and voids across its cross-section. The part made according to the method of the invention had very few voids and a smooth shiny surface. The void content of each part was measured. The void content of the part made according to the invention had an average of 2.3% by volume over three samples and the part made according to the prior art had an average void content of 24.5% by volume over three samples. Due to the complexity of the fiber feed system, no fiber preheating was used to make this part. It is anticipated that had fiber preheating been used, a slight additional decrease in void content would have been achieved in the parts made according to both the prior art method and the method of the invention.

The foregoing is meant to be illustrative only and not in any sense limiting. Variations within the scope of the invention will be understood by those of ordinary skill in the art.

Having described the invention, what is claimed is:

1. A method for wetting fiber reinforcements with matrix material in a pultrusion process comprising the steps of:
   a. closely associating the fiber reinforcements into a tow;
   b. passing the tow into an inlet port, through an internal cavity and out an outlet port of a pultrusion die said inlet port and outlet port each sized so that the tow passing through the port substantially pneumatically seals the inside of the pultrusion die from the atmosphere outside of the die;
   c. simultaneously performing the following two steps:
      i. impregnating the tow with matrix material by injecting matrix material at a first pressure into the tow through a first port in an enlarged cavity portion of the pultrusion die; and
      ii. degassing the impregnated tow by applying at a second port in said enlarged cavity portion of the pultrusion die a means for reducing pressure inside the cavity to below the first pressure.

2. A method for wetting fiber reinforcements with matrix material in a pultrusion process comprising the steps of:
   a. impregnating the tow fiber reinforcements matrix material;
   b. closely associated the fiber reinforcements into a tow;
   c. passing the two into an inlet port, an internal cavity and out an outlet port of a pultrusion die said inlet port and outlet port each sized so that the tow passing through the port substantially pneumatically seals the inside of the pultrusion die from the atmosphere outside of the die; and
   d. degassing the impregnated tow, as it passes through said internal cavity by applying to the tow and said cavity a pressure substantially below ambient pressure.

* * * * *

UNITED STATES PATENT AND TRADEMARK OFFICE
CERTIFICATE OF CORRECTION

PATENT NO. : 5,073,413

DATED : December 17, 1991

INVENTOR(S) : Christian Koppernaes et al

It is certified that error appears in the above—identified patent and that said Letters Patent is hereby corrected as shown below:

Claim 2, column 10, line 54, delete "tow".

Claim 2, column 10, line 54, after "reinforcements" insert --with--.

Claim 2, column 10, line 58, "two" should be --tow--.

Claim 2, column 10, line 58, after "port," insert --through--.

Signed and Sealed this

Sixteenth Day of November, 1993

Attest:

BRUCE LEHMAN

Attesting Officer

Commissioner of Patents and Trademarks